United States Patent

[11] 3,570,564

[72] Inventor Otto Bergler
 Lowersheim, Germany
[21] Appl. No. 755,856
[22] Filed Aug. 28, 1968
[45] Patented Mar. 16, 1971
[73] Assignee Eugen Lutz K. G. Maschinenfabrik
 Lomersheim, Germany
[32] Priority May 10, 1968, Jan. 3, 1968
[33] Germany
[31] L58272 and L47372/38

[54] CONVERTIBLE CIRCULAR BENCH SAW AND MITERING SAW
17 Claims, 6 Drawing Figs.

[52] U.S. Cl.................................................. 143/1, 143/6, 143/46
[51] Int. Cl.............................................. B27b 5/00
[50] Field of Search.......................................... 143/6, 1, 46, 47; 83/(Inquired)

[56] References Cited
UNITED STATES PATENTS

| 1,587,734 | 6/1926 | Jacobs et al. | 143/1(-1) |
| 1,924,672 | 8/1933 | Zachara | 143/6(-47) |
| 2,851,068 | 9/1958 | Goodlet | 143/46X |
| 3,105,528 | 10/1963 | Loughridge | 143/6(-46) |

Primary Examiner—Donald R. Schran
Attorney—Craig, Antonelli, Stewart & Hill

ABSTRACT: A convertible saw with a circular saw blade which is of a very simple design so as to permit the plate-shaped worktable with the elements thereon including the motor and saw blade to be reversed 180° from an upper position in which miter cuts may be made to a lower position in which long straight cuts may be made. In the upper mitering position the motor and saw blade may be pivoted downwardly toward the worktable to cut through a workpiece, while in the lower position the motor and saw blade are locked to the worktable so that the saw blade projects for a considerable distance through the slot in the worktable.

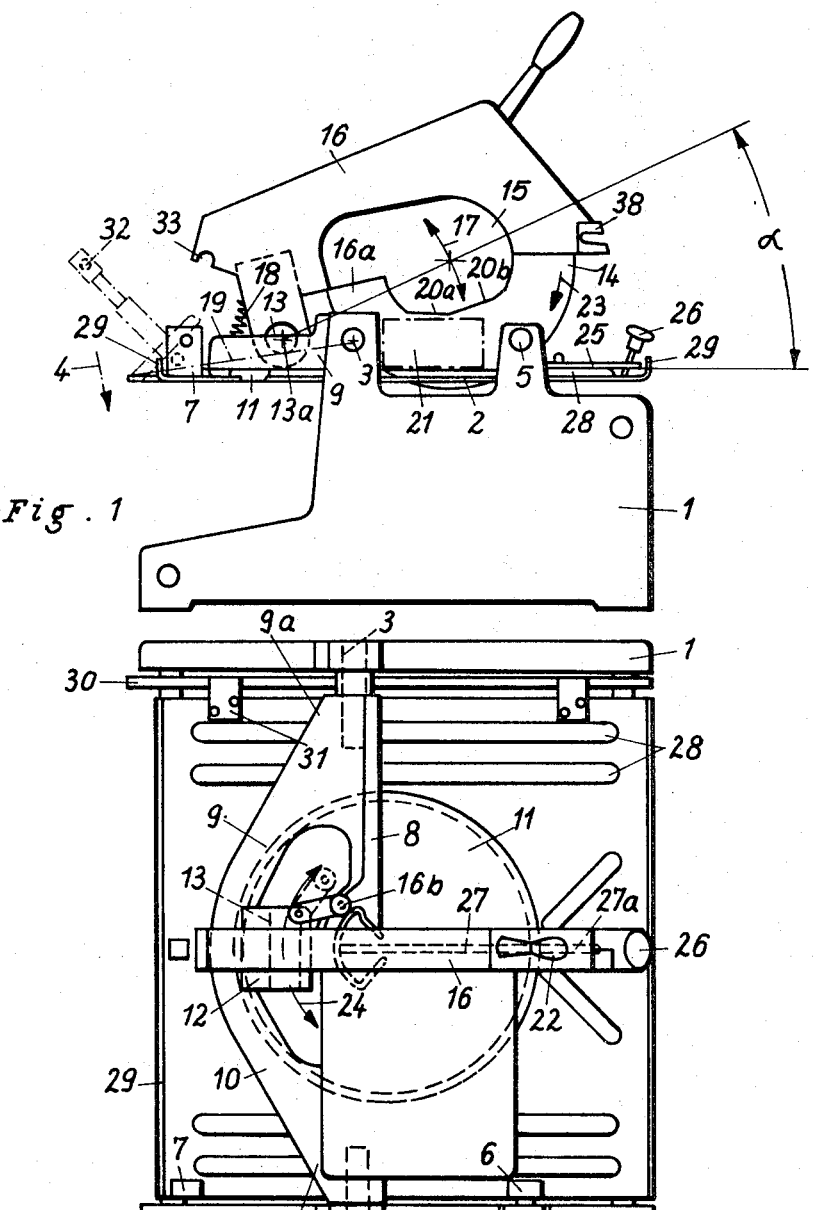

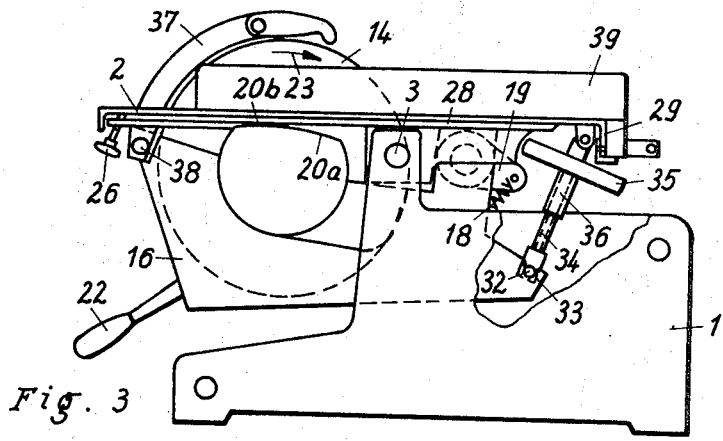
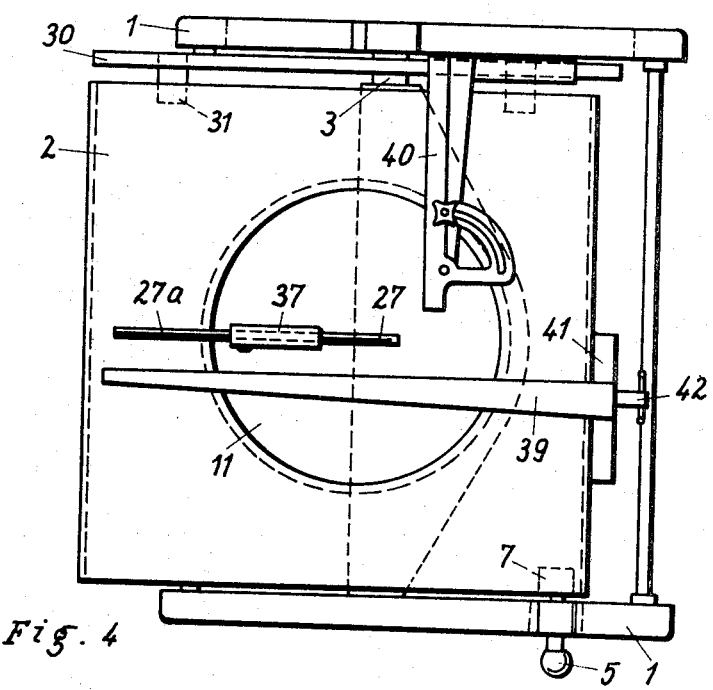

Patented March 16, 1971 3,570,564

INVENTOR
OTTO BERGLER
BY
Craig & Antonelli
ATTORNEYS

CONVERTIBLE CIRCULAR BENCH SAW AND MITERING SAW

The present invention relates to a convertible machine which forms the combination of a bench saw and a mitering saw and comprises a single motor-driven circular saw blade and workpiece supporting and guiding means for the two different purposes of the machine.

Such convertible machines which may be employed either as a circular bench saw or as a mitering saw are generally known. They have been designed to satisfy the need for a multiple purpose machine which eliminates the expense as well as the space required for several individual machines each of which is built for only one purpose. These known convertible bench and mitering saws have, however, the disadvantage that their convertibility and the different requirements which they have to fulfill require them to be rather heavy, large and expensive.

Thus, for example, there are convertible saws of this type known in which the saw blade projects upwardly through a slot in the worktable when the machine is used either as a normal bench saw for long straight cuts or for carrying out miter cuts. Such saws have the disadvantage that, when making miter cuts, the workpieces are not pressed by the cutting pressure against the worktable and the miter guide or stop bar so that special clamping means are required. These saws are therefore not suitable for mitering small strips or workpieces of a special cross-sectional shape or such work can at least not be carried out economically.

For employing a mitering saw also as a bench saw, it is also known to mount the work plate of a bench saw as an additional element on the pivotable saw housing of the mitering saw. This additional work plate may, however, only be relatively small because it obstructs the view upon the cut when the saw is used for mitering work. Moreover, such a saw is hard to manipulate since the second work plate which is mounted on the pivotable saw housing increases considerably the weight of this housing. The conversion of this machine from straight bench saw cutting to miter cutting is also rather complicated. Finally, the pivotable hoodlike guard which is required on such a saw for safety reasons must be of a telescoping construction since the second work plate which is provided on the upper side of the saw housing limits the movability of this guard.

The most important objects of the present are to provide a convertible bench and mitering saw which does not possess any of the above-mentioned disadvantages of such saws as heretofore used, is inexpensive and easy to transport and to manipulate, may be easily and quickly converted from one use to another, and is in its entirety of a weight so as to permit a single person to carry it when it is to be used, for example, in the interior construction of rooms in which boards or strips have to be cut alternately to certain lengths or to form miter joints.

The essential features of the invention for attaining these objects consist in providing the machine with a work plate, in providing a part of this work plate with a straight slot for the entry of the circular saw blade, in pivotably mounting the saw blade and its bearing means on one side of the work plate so as to be pivotable relative to this plate for carrying out miter cuts, and in mounting the work plate so as to be reversible together with the saw blade and its bearing means about an angle of 180° from a first position in which the axis of rotation of the saw blade is located above the work plate for carrying out miter cuts to a second position in which the axis of the saw blade is located underneath the work plate as in a normal circular bench saw for carrying out long straight cuts.

Another feature of the invention consists in providing simple adjustable locking means which, when the saw blade in the first or miter-cutting position has been pivoted toward the work plate and the saw blade has passed into the slot in this plate, will lock the saw blade to the work plate in a position in which, when the work plate together with the saw blade is then reversed to the second position, the saw blade will project upwardly through the slot in the work plate for the distance required for a straight-cutting operation.

For pivotably mounting the saw blade and its bearing means on the work plate for miter-cutting operations the invention further provides a housing for the saw blade in which the saw blade is rotatably mounted and which, in turn, is pivotably mounted in the work plate. The motor for driving the saw blade is preferably mounted directly on this saw housing and the side of the motor and of this housing facing the work plate is designed so as to permit the saw blade when in the position underneath the work plate to project as far as possible through the slot in the work plate. Since on the first or miter-cutting side of the work plate a guide bar is provided for guiding the workpiece at the desired angle to the saw blade for carrying out a miter cut, the saw housing is provided with a suitable recess in its lower side which permits the housing with the saw blade to be pivoted over the guide bar to its lowest position relative to the worktable.

For adjusting the saw blade and the guide bar at different angles to each other, the invention provides the guide bar to be rigidly mounted on the miter-cutting side of the work plate and the saw housing which carries the saw blade and its driving motor to be mounted on the work plate to permit it to be turned to different angles about an axis which extends perpendicular to the work plate.

For this purpose, the invention further provides the work plate to be divided into two parts, namely, the work plate itself and a circular disc which is rotatably mounted in a circular aperture in the work plate and provided with the slot through which the saw blade may project during either of its cutting operations. Since the saw housing is pivotably mounted on the circular disc about an axis which extends parallel to the plane of this plate, the saw blade is at all times in alignment with the slot in this disc and may be adjusted to any angle relative to the miter guide bar and be clamped by simple means in the adjusted position to the work plate.

As already indicated, it is another object of the invention to make the new machine of the smallest possible size and the lightest possible weight. For attaining this object, the invention provides that the circular disc which is rotatable in the work plate and serves for adjusting the saw blade to the desired angle relative to the guide bar for miter cuts is made of the smallest possible diameter which, in turn, permits the work plate in which this circular disc is rotatably mounted to be made of a relatively small size. For reducing the diameter of the circular disc as much as possible, the invention takes advantage of the fact that for miter-cutting operations, in which the saw blade is pivoted so as to cut downwardly through the workpiece the saw blade only needs to project sufficiently through the slot in the circular disc so as to sever the workpiece. Consequently, for miter-cutting operations the slot does not have to be as long as it would have to be when the work plate together with the circular disc, the saw housing and the saw blade is turned over about an angle of 180° to its other position for long straight cuts, in which the saw blade should pass upwardly through the slot so as to project to the greatest possible height above the upper side of the work plate and the circular disc since this height determines the maximum height or thickness of the workpieces to be cut. Consequently, for these cutting operations the slot should have a length almost as large as or larger than the diameter of the circular saw blade.

Since for these straight cutting operations the circular disc is clamped in a fixed position to the work plate in which the plane of the saw blade and the slot in the circular disc extend parallel to the guide bar for guiding the workpiece in a straight direction, the invention provides that this slot be extended through the outer periphery of the circular disc and for the desired length into the work plate itself.

While for miter-cutting operations the saw blade is guarded by the saw housing, safety regulations require the circular saw blade especially of a bench saw to be provided with a suitable curved guard which is usually designed so as also to serve as a splitting wedge which, when a larger cut is being made into a workpiece, passes into the cut and slightly wedges apart its sidewalls so as to facilitate the cutting operation and prevent excessive friction of the saw blade on the sidewalls of the cut. Since this splitting wedge should be effective immediately above the upper surface of the work plate in its second or straight-cutting position, the invention provides the mentioned slot in the work plate which forms a straight extension of the slot in the circular disc to be further extended and the splitting wedge to be removably secured to the saw housing which is then located underneath the work plate. The splitting wedge then extends through the last part of this slot to the upper side of the work plate and around a part of the periphery of the cutting edge of the saw blade.

Although for mounting the work plate with the various elements thereon either in the first or miter-cutting position or in the reversed second position for carrying out large cuts, various means may be provided, for example, in the form of feet which may be connected to either side of the work plate, or may be pivoted so as to project from one side or the other, it is more advantageous to combine the various elements of the machine into a structural unit by pivotably mounting the work plate in a light supporting frame so as to permit it to be easily pivoted in this frame from the first to the second position and vice versa and to be locked in either of these position. Since the reversal of the work-supporting sides of the work plate within the supporting frame does not change the cutting direction of the saw blade, the operator of the machine may remain in the same position in front of the supporting frame to carry out either of the cutting operation. The supporting frame may therefore even be secured in a fixed position on a bench, table or the like.

The machine according to the invention has the further advantage that it may be provided with removable supporting rails or the like on which an additional work plate is slidable in the axial direction of the saw blade and may be locked thereon at the desired distance from the saw blade when the machine is employed as a bench saw. The main work plate of the machine may in this manner be enlarged as may be required in a particular case. If such supporting rails were already mounted on the machine for a previous miter-cutting operation, for example, for supporting a work-guiding bar, stop member or the like, these supporting rails may be left on the machine when the main work table is reversed for straight-cutting operations and may then be employed for mounting the additional work plate thereon.

The above mentioned as well as additional features and advantages of the present invention will become further apparent from the following detailed description thereof, which is to be read with reference to the accompanying drawings, in which:

FIG. 1 shows a side view of the convertible machine according to the invention in its position for being used as a miter-cutting saw;

FIG. 2 shows a top view of the machine in the position according to FIG. 1

FIG. 3 shows a side view of the machine according to FIG. 1, but in its position for being used as a normal circular or bench saw;

FIG. 4 shows a top view of the machine in the position according to FIG. 3;

Figure 5:
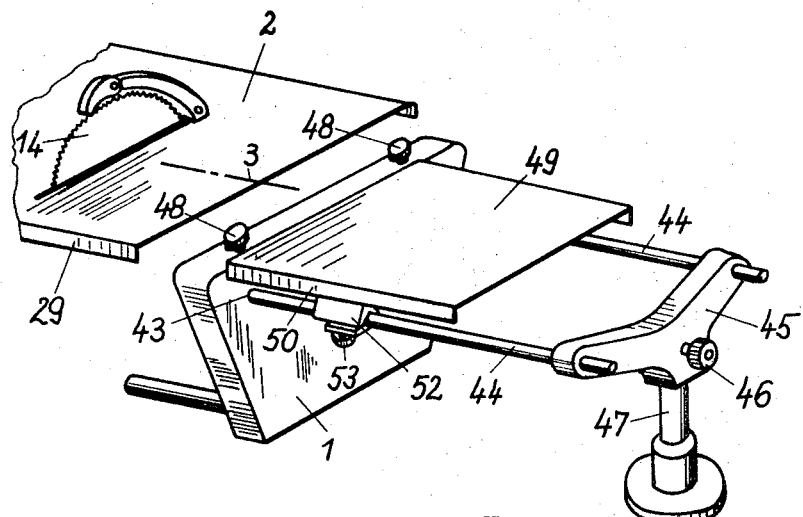
Figure 6:
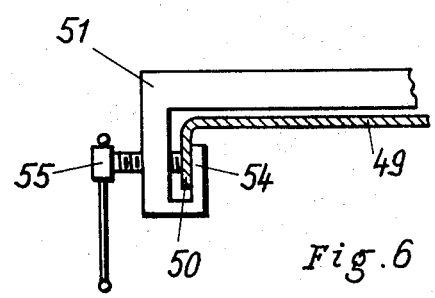

FIG. 5 shows a perspective view of a part of the machine in its position as a bench saw and of an additional adjustable work plate mounted thereon; while FIG. 6 shows a cross section of the additional work plate which is taken in a direction transverse to the supporting bars which are mounted on the machine frame, and also illustrates a longitudinal guide bar which may be mounted on the main work plate according to FIGS. 3 and 4 or on the additional work plate according to FIG. 5.

As illustrated particularly in FIGS. 1 and 2 of the drawings, the convertible machine according to the invention forming a circular bench saw and a miter-cutting saw, comprises a main frame 1 in which a work plate 2 is mounted so as to be pivotable 180° about pivot pins 3 in the direction of the arrow 4 to the position as shown in FIG. 3. For securing the work plate 2 together with the various elements thereon relative to the frame 1 in the position as shown in FIG. 1, a locking bolt 5 is provided in frame 1 which then engages into a corresponding bore in a bracket 6 on work plate 2. When work plate 2 together with the elements thereon is pivoted about the pivot springs 3 at an angle of 180° to the position as shown in FIG. 3, it may also be locked in this position by inserting the locking bolt 5 into the bore in the other bracket 7 on work plate 2.

Work plate 2 carries a transverse stop or guide bar 8 which in this embodiment of the invention is mounted on a supporting element 9, the ends 9a and 9b of which together with the ends of stop bar 8 contain the pivot pins 3 which support the work plate 2 in the frame 1. The supporting element 9 of guide bar 8 is mounted by means of screws (not shown) on work plate 2. Guide bar 8 and supporting element 9 also serve as means for guiding and holding down a rotatable circular disc 11 which is inserted into a circular aperture in work plate 2 and has integrally thereon a bushing 12 in which by means of a pin 13 the saw housing 16 together with the motor 15 and the saw blade 14 is mounted so as to be pivotable about the axis 13a in the directions of the double arrow 17. A draw spring 18 which is connected at one end to a projection on the bearing member 12 tends to draw the saw housing 16 at all times in the upward direction. For varying its effective strength, spring 18 may be connected to an arm 19 which is adjustably secured to bearing member 12. The other end of spring 18 may be directly connected to the circular disc 11. The lower side 10a and 10b of the saw housing 16 is flattened so that for making a miter cut on a workpiece 21, as indicated in dot-and-dash lines in FIG. 1, only a relatively small saw blade 14 will be required, while when the machine is to be used as a bench saw as shown in FIG. 3, saw blade 14 will project sufficiently from below through the slot 27 to cut a relatively high or thick workpiece. The part 20a of the saw housing forms for this purpose a tangent on the smallest possible diameter of motor 15. This tangent and a straight line connecting the axis of rotation of saw blade 14 with the pivot axis 13a together enclose an angle which corresponds to the adjusting angle $a$ of the saw housing 16 relative to the work plate 2. The inclined surface 20b of saw housing 16 is similarly designed for the operation of the machine as a bench saw. The saw housing 16 is further provided with a recess 16a into which, when the housing is pivoted downwardly the guide bar 8 and its supporting element 9 may pass without interference. The saw housing 16 is provided with a handlebar 22 by means of which the saw blade 14 which rotates in the direction of the arrow 23 may be lowered so as to cut the workpiece 21 which abuts against the guide bar 8. For limiting the extent of the pivoting movement of saw housing 16, the latter is provided with a stop member 16b which in the position as shown in FIG. 2 abuts against the guide bar 8, while when the machine is to be employed as a bench saw, this stop member 16b may be pivoted to the position as indicated in FIG. 2 in dotted lines.

Before being used as a miter-cutting saw, the circular disc 11 together with the saw housing 16, carrying the saw blade 14 and its motor 15 must be turned in work plate 2 in the direction of the arrows 24 (FIG. 2) so that the saw blade 14 will be disposed at the desired angle to the guide bar 8. After the saw blade has been properly adjusted, disc 11 is to be clamped together with work plate 2 by means of a double claw 25 which is secured by a pair of screws to work plate 2 and is pressed upwardly by a hand screw 26 on its right end whereby its left end is pressed against the circular disc 11. Disc 11 is provided with a slot 27 into which the saw blade 14 may enter when lowered sufficiently to cut through the workpiece 21. For reinforcing the thin work plate 2 which consists of sheet metal, corrugations 28 are impressed therein from below which extend at right angles to the upwardly bent front and rear edges 29 of work plate 2 which likewise serve for reinforcing this plate. As may be seen in FIG. 1, the upper surfaces of these corrugations 28 also serve as supporting surfaces for the workpiece 21 when carrying out miter cuts.

Work plate 2 is further provided with a guide rail 30 which is screwed thereon by means of straps 31 but is not actually used until work plate 2 with the various elements thereon has been pivoted to the position according to FIGS. 3 and 4 in which the machine serves as a circular bench saw. Before work plate 2 is thus turned over it is, however, necessary to insert a stop bolt 32 into its bearing recess 33 in housing 16. This stop bolt subsequently serves for securing the saw blade 14 in slot 27 at the desired level relative to work plate 2. In order to permit the saw blade 14 to project as far as possible from below through the slot 27 without requiring the circular disc 11 to be made of a very large diameter, work plate 2 is provided with a slot 27a which, when disc 11 is in its basic position as shown particularly in FIG. 4, forms a straight extension of the slot 27 in disc 11. This slot 27a in work plate 2 is, however, of importance only when the machine is used as a bench saw since for miter-cutting operations when the machine is in the position as shown in FIGS. 1 and 2 the saw blade 14 only needs to enter for a short distance into the slot 27 when cutting through a workpiece 21.

In FIGS. 3 and 4, work plate 2 with the various elements thereon including the motor 15, the saw blade 14, and the housing 16 is pivoted at an angle of 180° from the position according to FIGS. 1 and 2 in which it is locked by means of the locking bolt 5 which is then inserted into the bore in bracket 7. In addition, base plate 2 is secured in this position by the weight of saw blade 14, motor 15, and saw housing 16 and by the action of spring 18 which tend to turn the saw housing in the counterclockwise direction about the pivot pins 3 and thereby press the bearing part 33 upwardly against the stop bolt 32. This stop bolt 32 consists of a screw part 34 which is screwed into a threaded tubular part 36 the closed end of which is connected by a universal joint to base plate 2 so as to permit this part 36 to be turned by a handwheel 35 relative to the screw part 34 to vary the effective length of stop bolt 32 and thus to vary the distance which the saw blade 14 projects above the work plate 2 when the machine is used as a bench saw and work plate 2 together with the circular disc 11 support the workpiece to be cut. FIG. 3 shows the bench saw when adjusted to the greatest cutting thickness in which the flat part 20b which now forms the upper side of saw housing 16 abuts against the corrugations 28 on work plate 2. Since the direction of rotation of motor 15 remain the same in its upper and lower positions, saw blade 14 always rotates in the direction of the arrow 23. The operator's stand is therefore located at the right side of the machine when it is used as a mitering saw according to FIG. 1 and also when used as a bench saw according to FIG. 3.

Since the machine when used as a circular bench saw has to comply with special safely regulations, a blade guard which also serves as a splitting wedge 37 is provided around the saw blade 14. The rear end of this splitting wedge 37 extends through the rear end of slot 27a in work plate 2 and is secured to a bracket 38 on the saw housing 16. As previously mentioned, slot 27a forms an extension of slot 27 in the circular disc 11 so that even though the latter has a relatively small diameter, the large saw blade 14 may project so far above the work plate 2 as to permit workpieces of a considerably height or thickness to be cut. Slot 27a therefore has two functions, namely, to permit the splitting wedge 37 to be secured in a simple manner and to extend the length of the slot 27 in the circular disc 11.

FIGS. 3 and 4 further illustrate that, when the machine is used as a bench saw, the necessary guide bar 39 may be easily secured to the work plate 2. Another guide bar 40 may also be provided for pushing the workpiece forwardly while being cut. While this guide bar 40 is slidable along the guide rail 30 as previously mentioned, guide bar 39 is slidably along and adapted to be clamped in a fixed position to the right bent over edge 29 of work plate 2 by means of associated guide strips 41 and a tommy screw 42.

The present invention therefore provides a very advantageous combination of a circular bench saw with a miter-cutting saw which may be easily and quickly converted from one to the other. After being used as a bench saw in the position as shown in FIG. 3 and 4, it is merely necessary to remove the splitting wedge 37 and to retract the locking bolt 5 from the bore in bracket 7 before the base plate 2 and all the elements thereon may be swung over to the mitering position according to FIGS. 1 and 2. When the machine is then to be used as a mitering saw, it is only necessary to unhook the stop bolt 32 from its bearing part 33 on the saw housing 16.

FIG. 5 illustrates an auxiliary worktable according to the invention which consists of a plate 49 of thin sheet metal which may, if desired, be provided with reinforcing corrugations similarly as shown on the work plate 2 in FIG. 2. For supporting this auxiliary work plate 49 the end wall of frame 1 is provided with bores 43 into which the left ends of a pair of supporting rods 44 are inserted and clamped by setscrews 48, while their right ends are supported by a stand 45 which may be adjusted in height on its post 47 and then be clamped thereon by a setscrew 46. The downwardly bent front edge 50 of plate 49 is exactly in alignment with the corresponding front edge 29 of work plate 2. Since the edges 29 and 50 are exactly alike, a longitudinal guide bar as illustrated, for example, in FIG. 6 at 51 may be mounted either on work plate 2 or on the auxiliary plate 49. If plate 49 is adjusted to a position in which it directly abuts against the work plate 2, the longitudinal guide bar 51 may also be shifted from one to the other.

For sliding the auxiliary work plate 49 in the axial direction of saw blade 14, and thus also in the axial direction of pivot pins 3 along the supporting rods 44, plate 49 is provided on its lower side with slide members 52 each of which may have, for example a triangular or round lower side resting on the respective rod 44. These slide members 52 may be locked on rods 44 by clamping screws 53. As may be seen in FIG. 5, plate 49 may be lifted either toward the right or left to enlarge the supporting surface for the workpieces to the desired size.

It will not be necessary in every case to provide an additional stand as a support for the ends of the supporting rods 44, for example, when these rods have a relatively short length. It is also advisable to supply the machine with several sets of supporting rods of different lengths so as to permit the work-supporting surface to be enlarged at will. Thus, for example, if the work plate 2 of the machine has a size of only 80 × 80 cm., the supporting surface may be enlarged so as to permit entire doors of a length of more than 2 meters to be worked upon. The machine is in this case provided with supporting rods 44 of a considerable length and the auxiliary work plate 49 is shifted thereon far toward the right. The fact that a large gap is them formed between the main work plate 2 and the auxiliary plate 49 in which the workpiece is not supported does not affect the sawing operation; on the contrary, this gap may even facilitate the manipulation of the workpiece.

FIG. 6 finally illustrates the simple manner in which the longitudinal guide bar 51 may be secured to the auxiliary work plate 49. The front end of the guide bar is simple bent downwardly to form a V-shaped clamp 54 which may be slipped over the downwardly bent edge 50 of plate 49 and be tightly clamped thereon by a screw 55 after guide bar 51 has been shifted to the proper position on plate 49. Of course, other or additional guide bars or similar elements may also be mounted on the edge 50 of the plate 49 or on the corresponding edge 29 of the main work plate 2.

Although my invention has been illustrated and described with reference to the preferred embodiments thereof, I wish to have it understood that it is in no way limited to the details of such embodiments but is capable of numerous modifications within the scope of the appended claims.

I claim:

1. A convertible saw adapted to be used in a first position as a miter saw and in a second position as a circular bench saw comprising:

a work plate having a part with a straight slot therein and having opposite first and second sides, said first side being adapted in said first position to face upwardly to support a workpiece thereon for making miter cuts, said second side adapted in said second position to face upwardly to support a workpiece thereon for making longitudinal cuts;

bearing means for mounting said saw blade so as to be rotatable about its axis;

means for driving said saw blade;

means for pivotably connecting said bearing means to said first side of said work plate to permit said saw blade to be pivoted toward said first side and to cut from above through said workpiece thereon and then to enter said slot;

means for alternately mounting said workpiece substantially horizontally in said first position and in said second position;

said bearing means being located above said work plate in said first position and below said work plate in said second position; and releasable locking means for locking said bearings means in said second position to said work plate in which the axis of said saw blade is spaced at a fixed small distance from the lower side of said work plate and said saw blade then projects upwardly through said slot and for a fixed distance above the upper side of said work plate; wherein said bearing means comprise a saw housing pivotably connected to said first side of said work plate, said motor and saw housings having a flattened side facing said work plate so as to permit said saw housing including the driving axis of said motor and saw blade to be pivoted very closely to said work plate, a guide bar on said first side of said work plate for guiding a workpiece and extending transverse to the normal plane of said saw blade, said housing having a recess in its side facing said work plate adjacent to said flattened part, said recess being adapted to receive said transverse guide bar when said housing is pivoted in said first position to its smallest distance from said work plate.

2. A convertible saw as defined in claim 1, in which said flattened side has two parts which are adjacent to each other, one of said flattened parts forming a tangent on the smallest possible motor diameter, said tangent together with a straight line intersecting the axis of said saw blade and the pivot axis of said saw housing defining an angle corresponding to the maximum angle about which said saw housing has to be pivoted toward said work plate when a workpiece of the greatest admissible height from said work plate is to be cut in said first position, the other flattened part forming a similar tangent which together with said straight line defines the maximum angle which said saw housing has to be pivoted toward said work plate for attaining the greatest possible cutting depth of said saw blade and thus the greatest distance which said saw blade projects above said work plate in said second position.

3. A convertible saw as defined in claim 1, further comprising a stop member on said saw housing for limiting the distance to which said saw blade in said first position may be pivoted into said slot, said stop member being adapted to be moved to an inactive position when said work plate is to be moved from said first position to said second position.

4. A convertible saw as defined in claim 1, in which said work plate comprises two parts, the first of said parts being stationary in said first and second positions and having a circular aperture the second part of said work plate forming a circular disc rotatably mounted in said circular aperture so as to be rotatable about a central axis extending perpendicular to the common plane of said work plate and said disc, said disc containing said slot, bearing means for pivotably connecting one end of said saw housing to said disc on said first side of said work plate, said saw housing by being connected to said disc being adapted in said first position to be turned together with said saw blade to different angles relative to said guide bar for cutting said workpiece at different miter angles, means for clamping said disc to said stationary part of said work plate when the plane of said saw blade and said slot extend at a right angle to said guide bar and when said work plate including said disc said motor and said saw blade is to be reversed from said first to said second position and when said locking means are in the locking position in which said locking means rigidly connect said stationary part of said work plate to said saw housing and in which the axis of said saw blade when in said second position is spaced at said small distance from the lower side of said work plate.

5. A convertible saw as defined in claim 4, in which said slot in said disc extends to the periphery of said disc, said stationary part of said work plate also having a slot forming a straight extension of said slot in said disc when the plane of said saw blade and said disc slot extend at a right angle to said guide bar so as to permit said saw blade to project for a greater distance through said work plate in said second position than required in said first position.

6. A convertible saw as defined in claim 5, further comprising a curved guard member also serving as a splitting wedge covering a part of the peripheral surface of said saw blade projecting in said second position above said work plate including said disc, the rear end of said guard member extending downwardly through a part of said extension slot, and means for removably securing said end of said guard member to said saw housing when said housing is in said second position below said work plate.

7. A convertible saw as defined in claim 1, further comprising a connecting part on said saw housing and another connecting part on said work plate, said locking means comprising a spacing element connected in said second position to said two connecting parts for maintaining said saw housing and said work plate at said small distance from each other, said spacing element being removable from at least one of said connecting parts when said work plate and the various parts thereon are to be moved from said second position to said first position.

8. A convertible saw as defined in claim 7, in which said spacing element comprises an internally threaded tubular member connected at one end to one of said connecting parts, and a screw member connected at one end to the other connecting part and screwed into said tubular member, the effective length of said spacing element being adjustable when said two members are turned relative to each other so as to vary the distance to which said saw blade projects above said work plate in said second position.

9. A convertible saw as defined in claim 1, further comprising a frame and means for pivotably connecting said work plate to said frame to permit said work plate to be pivoted about an angle of 180° from said first position to said second position and vice versa.

10. A convertible saw as defined in claim 4, further comprising a frame, and means for pivotably connecting the opposite ends of said transverse guide bar to said frame to permit said work plate to be pivoted about an angle of 180° from said first position to said second position and vice versa.

11. A convertible saw as defined in claim 10, further comprising means for rigidly securing said guide bar to said stationary part of said first side of said work plate, the wall of said circular aperture having an annular inwardly projecting flange adjacent to said second side of said work plate for supporting said disc in said first position, said guide bar extending over said disc in said first position so as to hold said disc on said flange and to permit it to be rotated between said flange and said guide bar.

12. A convertible saw as defined in claim 1, in which said work plate consists of thin sheet metal and has two outer edges parallel to each other and bent upwardly from said first side of said work plate, said work plate having corrugations impressed into said second side and projecting from said first side and extending at an angle to said edges.

13. A convertible saw as defined in claim 10, further comprising supporting bars, means for removably securing said supporting bars to said frame so as to extend parallel to the axis of said saw blade, and an auxiliary work plate slidably on said supporting bars in the axial direction of said saw blade, and means for locking said auxiliary work plate to at least one of said supporting bars.

14. A convertible saw as defined in claim 13, in which said work plate and said auxiliary plate consist of thin sheet metal and each of them has two outer edges parallel to each other and bent downwardly as seen from said second side of said work plate, at least one of said edges of one of said plates being in straight alignment with the corresponding edge of the other plate and forming a guide rail, and a longitudinal work-guiding bar adapted to be mounted on and slidably along said guide rail and extending parallel to said saw blade on said second side, and means for locking said bar in any adjusted position to said guide rail of either of said plates.

15. A convertible saw as defined in claim 13, in which one end wall of said frame is provided with bores, said supporting bars forming rods each having one end adapted to be inserted into one of said bores, means for removably securing said rod ends in said bores, and a stand having arms adapted to connect said rods rigidly to each other near their other ends, if said rods have a considerable length, for supporting said other ends, and means on said stand for adjusting the height of said stand.

16. A convertible saw adapted to be used in a first position as a miter saw and in second position as a circular bench saw comprising a work plate having a part with a straight slot therein and having opposite first and second sides, said first side being adapted in said first position to face upwardly to support a workpiece thereon for making miter cuts, said second side adapted in said second position to face upwardly to support a workpiece thereon for making longitudinal cuts, bearing means for mounting said saw blade so as to be rotatable about its axis, means for driving said saw blade, means for pivotably connecting said bearing means to said first side of said work plate to permit said saw blade to be pivoted toward said first side and to cut from above through said workpiece thereon and then to enter said slot, means for alternately mounting said work plate substantially horizontally in said first position and in said second position, said bearing means being located above said work plate in said first position and below said work plate in said second position, and releasable locking means for locking said bearing means in said second position to said work plate in which the axis of said saw blade is spaced at a fixed small distance from the lower side of said work plate and said saw blade then projects upwardly through said slot and for a fixed distance above the upper side of said work plate, in which said work plate comprises two parts, the first of said parts being stationary in said first and second positions and having a circular aperture, the second part of said work plate forming a circular disc rotatably mounted in said circular aperture so as to be rotatably about a central axis extending perpendicular to the common plane of said work plate and said disc, said disc containing said slot, bearing means comprising a saw housing pivotably connected to said disc on said first side of said work plate, said driving means comprising a motor having a housing directly secured to said saw housing, said saw housing being connected to said disc being adapted in said first position to be turned together with said saw blade to different angles relative to a guide bar mounted on said first side of said work plate for cutting said workpiece at different miter angles, means for clamping said disc to said stationary part of said work plate when the plane of said saw blade and said slot extend at a right angle to said guide bar and when said work plate including said disc, said motor and said saw blade is to be reversed from said first to said second position and when said locking means are in the locking position in which said locking means rigidly connect said stationary part of said work plate to said saw housing and in which the axis of said saw blade when in said second position is spaced at said small distance from the lower side of said work plate.

17. A convertible saw as defined in claim 16, in which said slot and said disc extends to the periphery of said disc, said stationary part of said work plate also having a slot forming a straight extension of said slot in said disc where the plate of saw blade and said disc slot extend at a right angle to said guide bar so as to permit said saw blade to project for a greater distance through said work plate in said second position than required in said first position.